(12) United States Patent
Kawamoto et al.

(10) Patent No.: US 10,710,850 B2
(45) Date of Patent: Jul. 14, 2020

(54) REVOLVING FRAME FOR WORK MACHINE, AND WORK MACHINE PROVIDED WITH SAME

(71) Applicant: KOBELCO CONSTRUCTION MACHINERY CO., LTD., Hiroshima-shi (JP)

(72) Inventors: Kyohei Kawamoto, Kobe (JP); Yasuhiro Nakashima, Kobe (JP); Hiromitsu Hamaguchi, Hyogo (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 135 days.

(21) Appl. No.: 16/086,239

(22) PCT Filed: Mar. 30, 2017

(86) PCT No.: PCT/JP2017/013128
§ 371 (c)(1),
(2) Date: Sep. 18, 2018

(87) PCT Pub. No.: WO2017/170806
PCT Pub. Date: Oct. 5, 2017

(65) Prior Publication Data
US 2020/0031637 A1    Jan. 30, 2020

(30) Foreign Application Priority Data

Mar. 30, 2016  (JP) ................................. 2016-067642
Mar. 22, 2017  (JP) ................................. 2017-056042

(51) Int. Cl.
*B66C 23/84*    (2006.01)
*B66C 23/62*    (2006.01)
(Continued)

(52) U.S. Cl.
CPC ............ *B66C 23/84* (2013.01); *B62D 21/186* (2013.01); *B66C 23/36* (2013.01); *B66C 23/62* (2013.01); *B66C 23/78* (2013.01)

(58) Field of Classification Search
CPC ......... B66C 23/84; B66C 23/36; B66C 23/78; B66C 23/62; B66C 23/82; B62D 21/186
See application file for complete search history.

(56) References Cited

U.S. PATENT DOCUMENTS 3,794,184 A * 2/1974 Higgins .................. B66C 23/34
212/295
4,076,128 A * 2/1978 Tax .......................... B66C 23/52
212/195

(Continued)

FOREIGN PATENT DOCUMENTS

DE    10 2014 213 724 A1    1/2016
JP         10-250987 A        9/1998

(Continued)

OTHER PUBLICATIONS

Extended European Search Report dated Mar. 6, 2019 in Patent Application No. 17775340.7, 7 pages.

(Continued)

*Primary Examiner* — Michael E Gallion
(74) *Attorney, Agent, or Firm* — Oblon, McClelland, Maier & Neustadt, L.L.P.

(57) ABSTRACT

Lifting performance of a work machine is increased while suppressing an increase in a vehicle weight. When a slewing frame is seen from a side, a first reinforcement member is provided from a boom foot section to a front side part of a slewing bearing, a second reinforcement member is provided from the boom foot section to a mast foot section, and a third reinforcement member is provided from the mast foot section to a rear side part of the slewing bearing. Furthermore, a fourth reinforcement member is provided from a (Continued)

middle region (M) located at an upper end portion of the slewing frame and above a rear portion of the slewing bearing to the front side part of the slewing bearing, and a fifth reinforcement member is provided from the middle region (M) to the rear side part of the slewing bearing.

10 Claims, 13 Drawing Sheets

(51) Int. Cl.
*B62D 21/18* (2006.01)
*B66C 23/36* (2006.01)
*B66C 23/78* (2006.01)

(56) References Cited

U.S. PATENT DOCUMENTS

| | | | |
|---|---|---|---|
| 10,472,213 B2* | 11/2019 | Nakashima | B66C 23/66 |
| 10,479,656 B2* | 11/2019 | Carmel | B66C 23/32 |
| 10,494,038 B2* | 12/2019 | Irie | B62D 33/0604 |
| 10,549,962 B2* | 2/2020 | Nakashima | B66C 23/84 |
| 2007/0175849 A1* | 8/2007 | Yokoyama | B66C 23/62 212/180 |
| 2013/0223966 A1* | 8/2013 | Nakamura | B62D 21/186 414/687 |
| 2016/0362282 A1* | 12/2016 | Kataoka | B66C 23/64 |
| 2017/0267502 A1* | 9/2017 | Nakashima | B66C 23/84 |

FOREIGN PATENT DOCUMENTS

| | | |
|---|---|---|
| JP | 2000-143156 A | 5/2000 |
| JP | 2005-314106 A | 11/2005 |
| JP | 2010-241586 A | 10/2010 |
| JP | 2015-231914 A | 12/2015 |
| WO | WO 2012/067014 A1 | 5/2012 |

OTHER PUBLICATIONS

International Search Report dated Jun. 27, 2017 in PCT/JP2017/013128 filed Mar. 30, 2017.

* cited by examiner

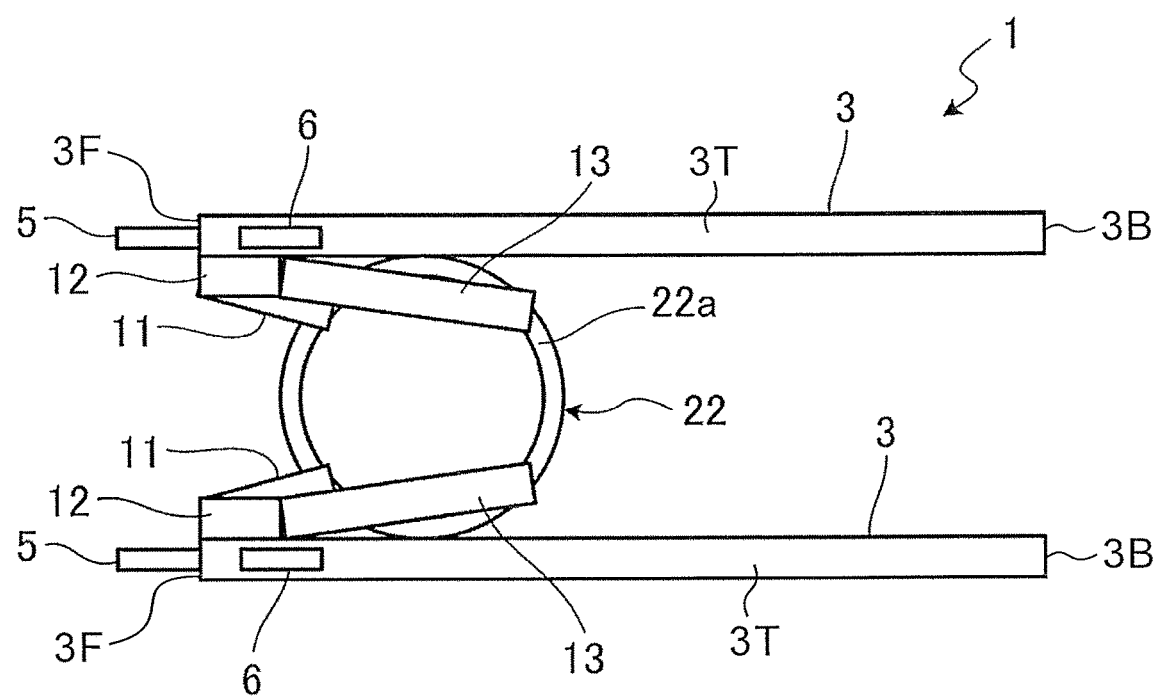

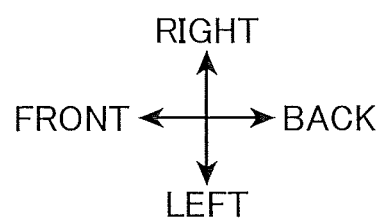
FIG.6
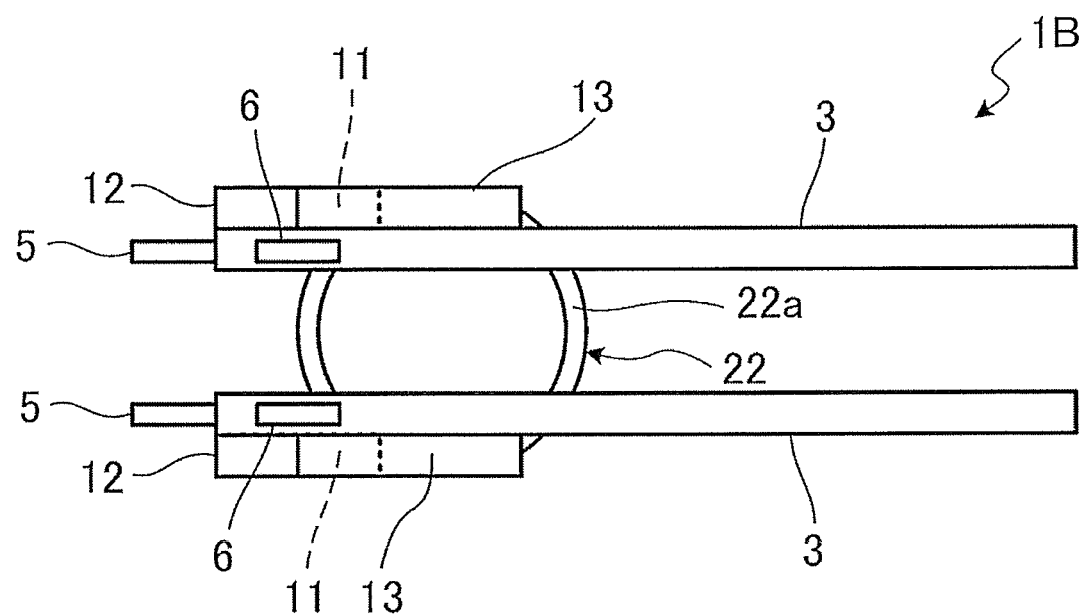

FIG.7A
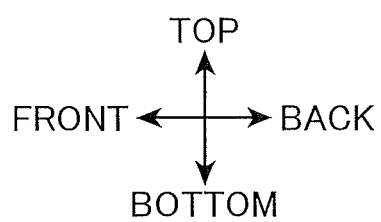
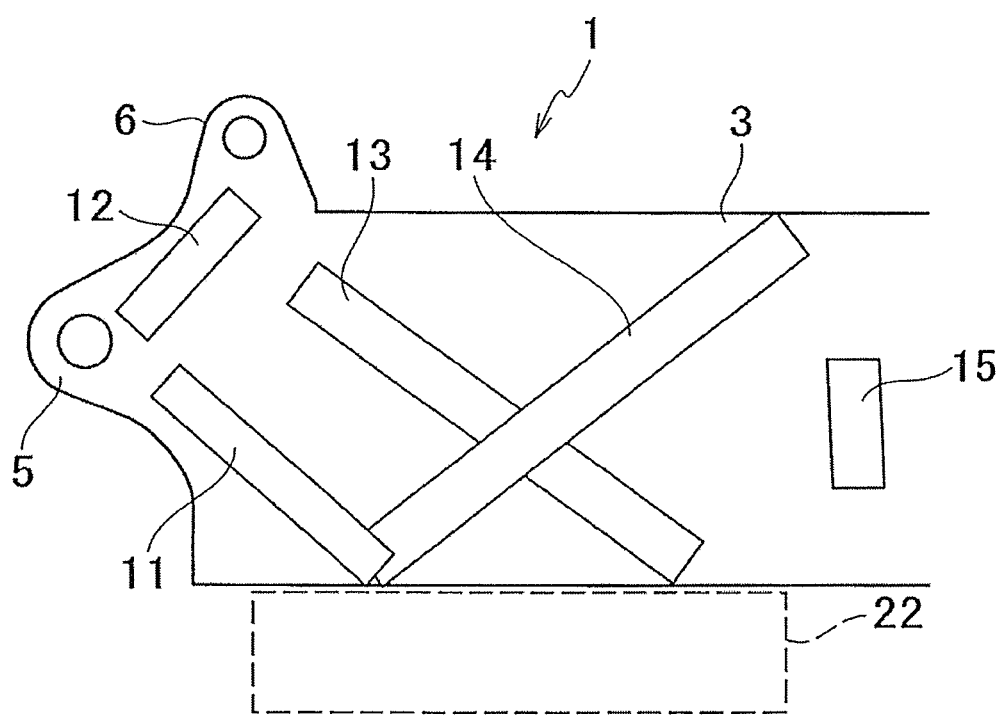

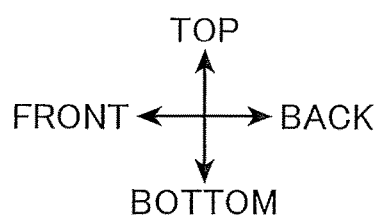
FIG.8A
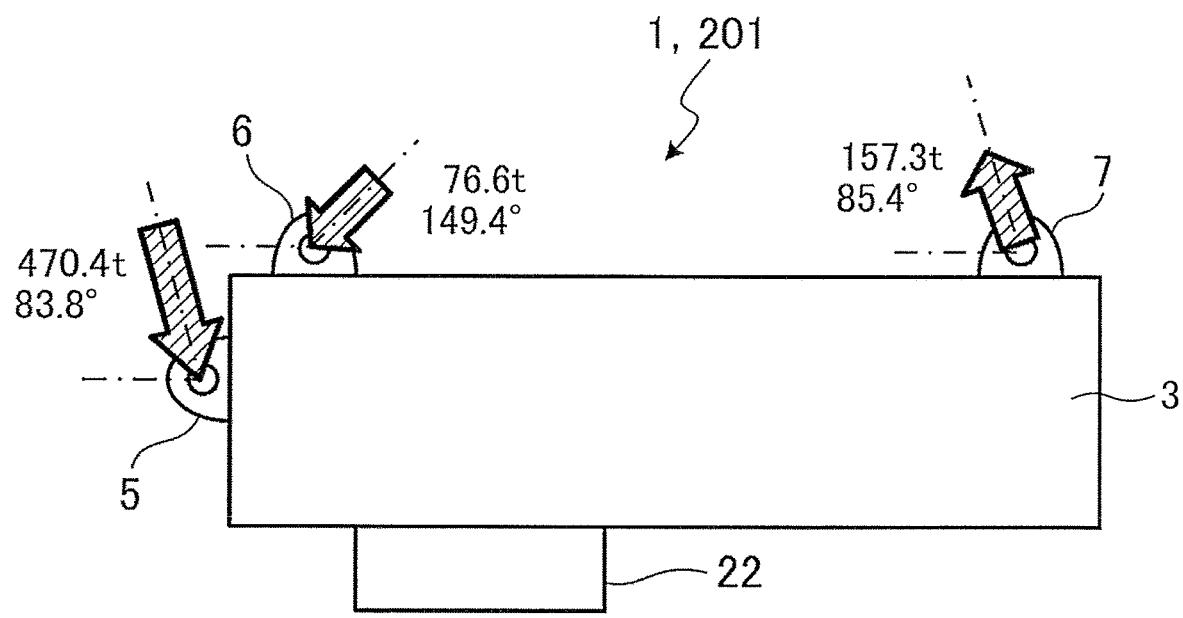

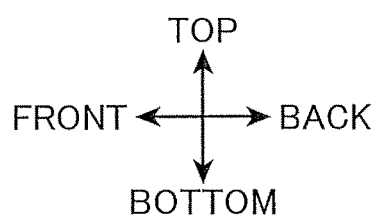
FIG.8B
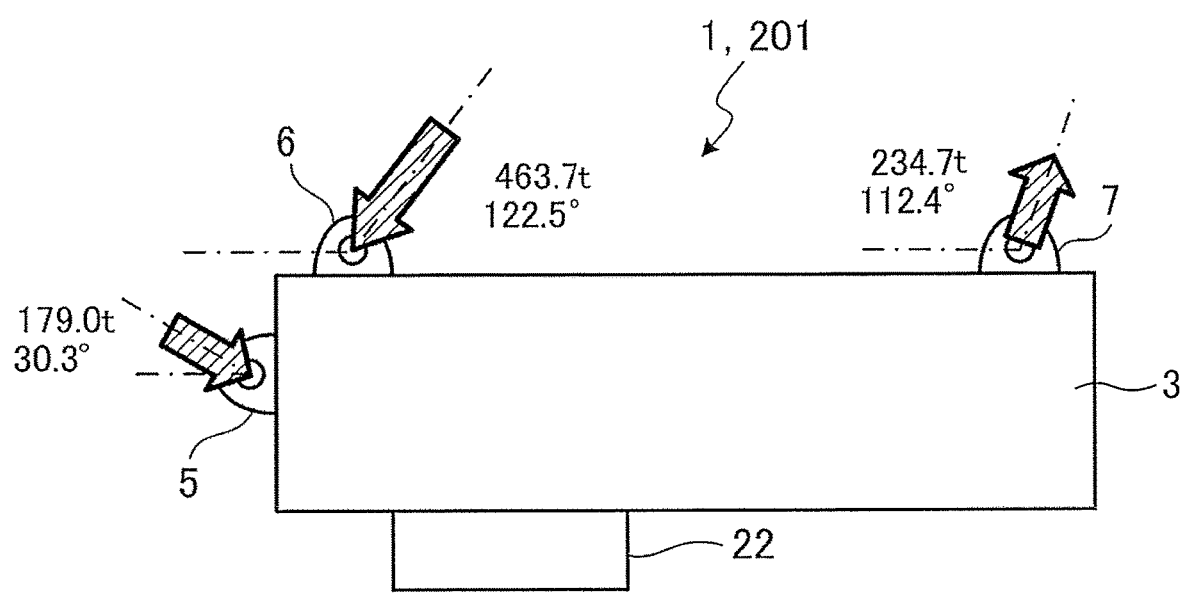

FIG.9
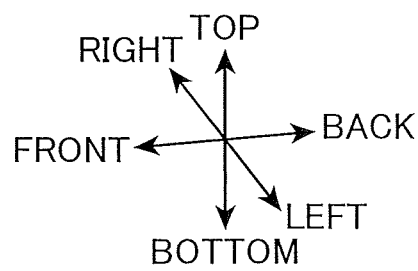
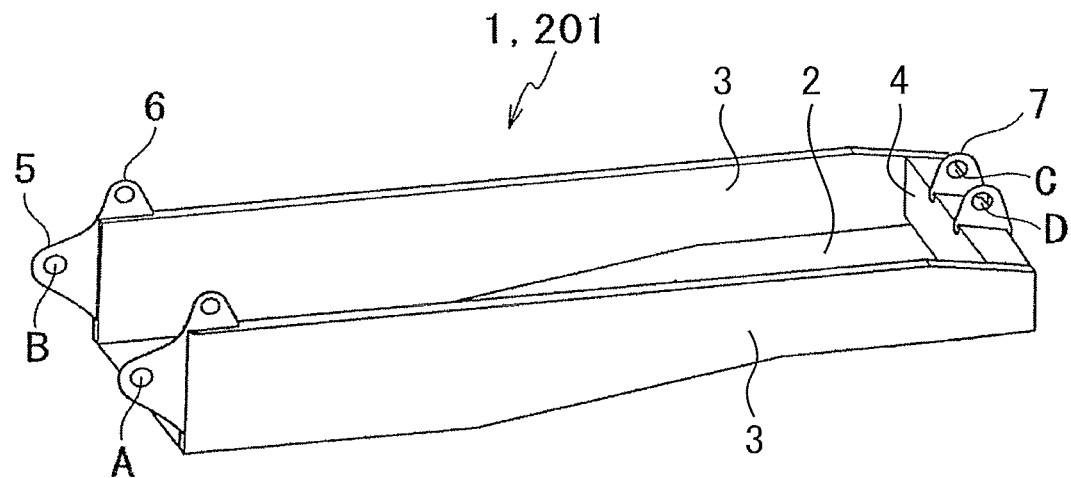

REVOLVING FRAME FOR WORK MACHINE, AND WORK MACHINE PROVIDED WITH SAME

TECHNICAL FIELD

The present invention relates to a slewing frame which is slewably supported on a lower travelling body of a work machine through a slewing bearing, and a work machine provided with the slewing frame.

BACKGROUND ART

As disclosed in Patent Literature 1, with a work machine such as a crane, an upper slewing body is slewably provided on an upper portion of a lower travelling body through a slewing bearing, for example. The upper slewing body includes a slewing frame slewably attached to the slewing bearing, a boom that performs lifting and the like of a lifting load, and a mast. For example, the work machine includes an upper spreader provided at a distal end portion of the mast, and a lower spreader provided on the slewing frame. The boom is hoisted when the mast is hoisted by a hoist rope wound around the upper spreader and the lower spreader.

CITATION LIST

Patent Literature

Patent Literature 1: JP 2005-314106 A

SUMMARY OF INVENTION

A boom foot section that supports a proximal end portion of the boom is provided on a front surface portion of the slewing frame, and a mast foot section that supports a proximal end portion of the mast is provided on a front side part of an upper surface portion of the slewing frame, and the lower spreader mentioned above is provided on a rear side part of the upper surface portion of the slewing frame. A weight of the boom and a weight of a lifting load act on the boom foot section, the mast foot section, and the lower spreader.

Loads occurring due to the work machine taking various orientations and a load occurring due to a load lifting task act on the slewing frame, and cause deformation of the slewing frame. The deformation affects deflection of a distal end portion of the boom or a distal end portion of a jib attached at a tip of the boom. This results in a problem that lifting performance of the work machine becomes limited.

It is conceivable to increase rigidity of the slewing frame by increasing a thickness of the entire slewing frame. However, a vehicle weight of the work machine, such as a crane, which is strictly regulated in terms of weight is greatly increased.

An object of the present invention is to provide a slewing frame, for a work machine, capable of increasing lifting performance of the work machine while suppressing an increase in a vehicle weight, and the work machine provided with the slewing frame.

Provided is a slewing frame for a work machine. The slewing frame is supported, through a slewing bearing, on a lower travelling body of the work machine to slew around a slewing center extending in a top-down direction, and supports a mast and a boom. The slewing frame includes a bottom plate, a pair of left and right side plates, a rear end member, a pair of boom foot sections, a pair of mast foot sections, a mast connection section, a pair of left and right first reinforcement members, a pair of left and right second reinforcement members, a pair of left and right third reinforcement members, a pair of left and right fourth reinforcement members, and a pair of left and right fifth reinforcement members. The bottom plate includes a bottom-plate upper-surface portion, and a bottom-plate lower-surface portion to which the slewing bearing is fixed. The pair of left and right side plates are disposed on the bottom-plate upper-surface portion, extend along a front-back direction of the slewing frame, and face each other in a left-right direction of the slewing frame across the slewing center, each of the pair of left and right side plates including a side-plate upper-surface portion, a side-plate front-end portion, and a side-plate rear-end portion. The rear end member connects the side-plate rear-end portions of the pair of left and right side plates in the left-right direction. The pair of boom foot sections are provided at the side-plate front-end portions of the pair of left and right side plates, respectively, and support a proximal end portion of the boom. The pair of mast foot sections are provided at front side parts of the side-plate upper-surface portions of the pair of left and right side plates, respectively, and support a proximal end portion of the mast. The mast connection section is provided at the rear end member, and is connected to the mast through a connection member. The pair of left and right first reinforcement members are each disposed extending from one of the boom foot sections toward a front side part of the slewing bearing, when the slewing frame is seen along the left-right direction, and each include a lower end portion linked to the front side part of the slewing bearing. The pair of left and right second reinforcement members are each disposed extending from one of the boom foot sections toward one of the mast foot sections, when the slewing frame is seen along the left-right direction. The pair of left and right third reinforcement members are each disposed extending from one of the mast foot sections toward a rear side part of the slewing bearing, when the slewing frame is seen along the left-right direction, and each include a lower end portion linked to the rear side part of the slewing bearing. The pair of left and right fourth reinforcement members are each disposed extending from a middle region, of an upper portion of one of the side plates, located above the rear side part of the slewing bearing, toward the front side part of the slewing bearing, when the slewing frame is seen along the left-right direction, and each include a lower end portion linked to the front side part of the slewing bearing. The pair of left and right fifth reinforcement members are each disposed extending from the middle region toward the rear side part of the slewing bearing, when the slewing frame is seen along the left-right direction, and each include a lower end portion linked to the rear side part of the slewing bearing.

According to the present invention, when the slewing frame is seen from the side, the first reinforcement member is provided from the boom foot section to the front side part of the slewing bearing, the second reinforcement member is provided from the boom foot section to the mast foot section, and the third reinforcement member is provided from the mast foot section to the rear side part of the slewing bearing. Furthermore, the fourth reinforcement member is provided from the middle region, of the upper portion of the side plate, located above the rear side part of the slewing bearing to the front side part of the slewing bearing, and the fifth reinforcement member is provided from the middle region to the rear side part of the slewing bearing.

Due to the weight of the boom or a lifting load, a compression load acts on a part between the boom foot section and the front side part of the slewing bearing. However, since rigidity of the part is increased by the first reinforcement member, deformation at the part is suppressed. Also at this time, a compression load acts on a part between the boom foot section and the mast foot section. However, since rigidity of the part is increased by the second reinforcement member, deformation at the part is suppressed. Also at this time, a tensile load acts on a part between the mast foot section and the rear side part of the slewing bearing. However, since rigidity of the part is increased by the third reinforcement member, deformation at the part is suppressed. Also at this time, a compression load acts on a part between the middle region and the front side part of the slewing bearing. However, since rigidity of the part is increased by the fourth reinforcement member, deformation at the part is suppressed. Also at this time, a tensile load acts on a part between the middle region and the rear side part of the slewing bearing. However, since rigidity of the part is increased by the fifth reinforcement member, deformation at the part is suppressed.

In this manner, because deformation of the slewing frame is suppressed, lifting performance of the work machine is increased. Because rigidity of parts where loads act are efficiently increased by five reinforcement members, an increase in the weight due to addition of the reinforcement members can be minimized. Accordingly, lifting performance of the work machine can be increased while suppressing an increase in the vehicle weight.

BRIEF DESCRIPTION OF DRAWINGS

FIG. 4A is a top view of the slowing frame according to the embodiment of the present invention.

FIG. 6 is a top view of a slewing frame according to a second modification of the present invention.

FIG. 7A is an enlarged side view of the slewing frame according to the embodiment of the present invention.

FIG. 8A is a side view of the slewing frame, showing magnitudes and angles of loads acting on the slewing frame under Condition 1.

FIG. 8B is a side view of the slewing frame, showing magnitudes and angles of loads acting on the slewing frame under Condition 2.

FIG. 9 is a perspective view of the slewing frame, showing measurement points for evaluation.

DESCRIPTION OF EMBODIMENTS

Hereinafter, a preferred embodiment of the present invention will be described with reference to the drawings.

(Configuration of Crane)

Figure 1:
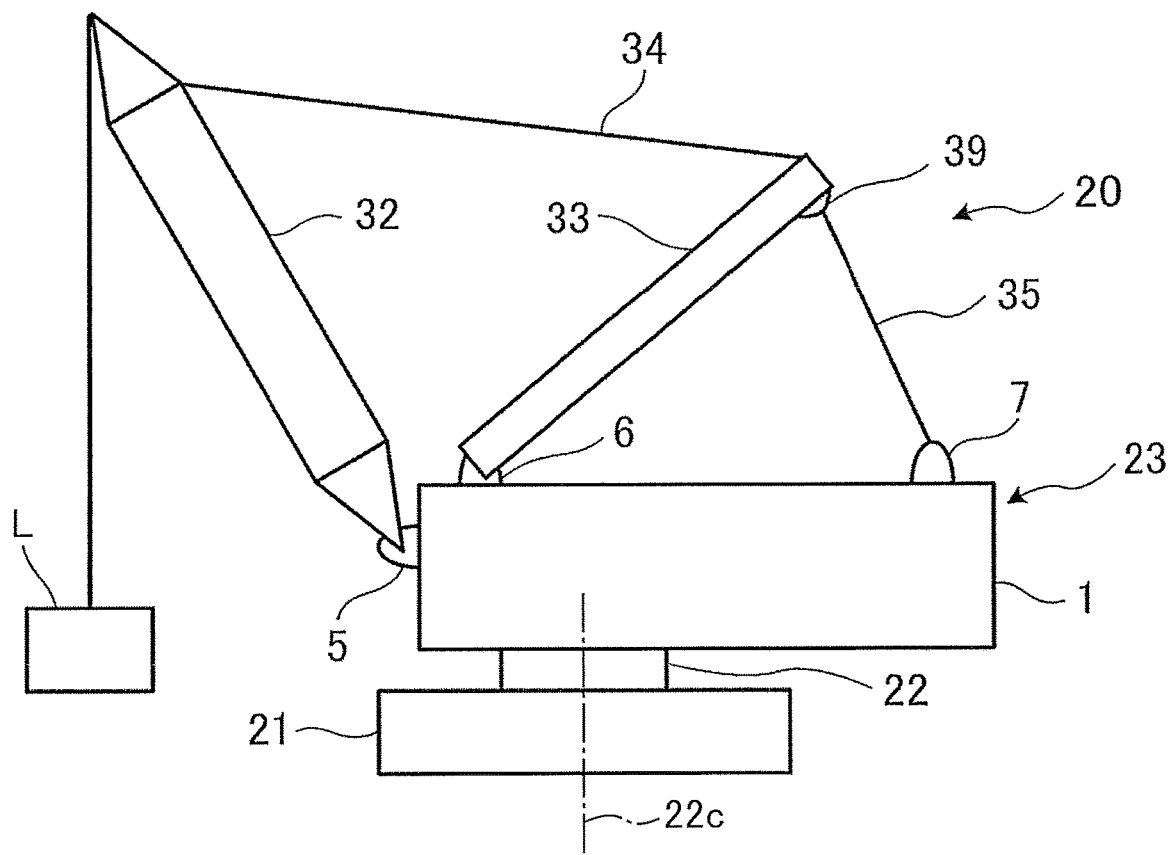
FIG. 1 is a side view of a crane according to an embodiment of the present invention.
Figure 2:
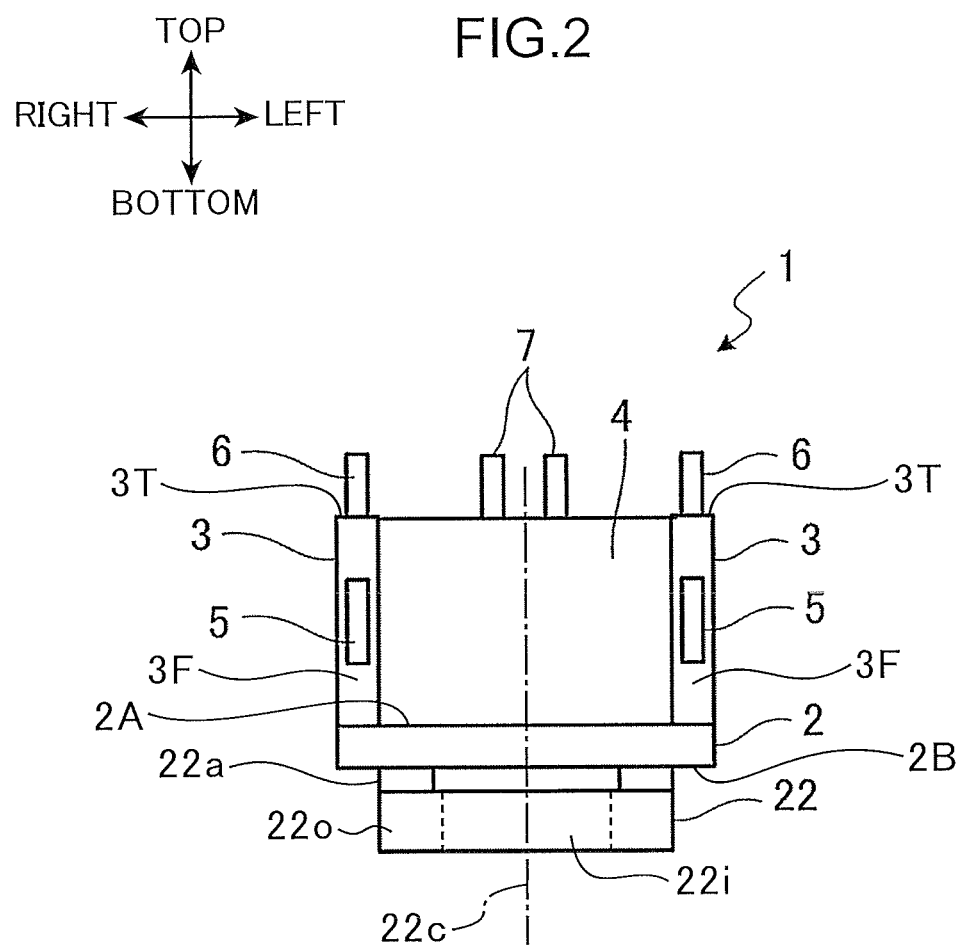
FIG. 2 is a front view of a slewing frame as viewed from front, according to the embodiment of the present invention.

A slewing frame 1 of a work machine according to an embodiment of the present invention is provided at a crane 20, which is a work machine. FIG. 1 is a side view of the crane 20 according to the present embodiment. FIG. 2 is a front view of the slewing frame 1 as viewed from front, according to the present embodiment. Additionally, in each drawing, front-back, left-right, and top-bottom directions of the slewing frame 1 are indicated by arrows. When a orientation of the crane 20 is as shown in FIG. 1, the front-back, left-right, and top-bottom directions of the slewing frame 1 coincide with front-back, left-right, and top-bottom directions of the crane 20. The crane 20 performs a lifting task (loading/unloading task) of lifting a lifting load L by a boom 32 described later, for example.

The crane 20 includes a lower travelling body 21, a slewing bearing 22, and an upper slewing body 23. The lower travelling body 21 is a part that allows the crane 20 to travel. The lower travelling body 21 may be a crawler type or a wheel type, for example. The upper slewing body 23 is slewably provided on an upper portion of the lower travelling body 21 through the slewing bearing 22.

The upper slewing body 23 includes the slewing frame 1, the boom 32, and a mast 33. In the following, a side of the boom 32 of the slewing frame 1 will be referred to as a front side, and a side of the slewing frame 1 opposite the boom 32 as a rear side.

The slewing frame 1 is supported on the lower travelling body 11 of the crane 20 through the slewing bearing 22 to slew around a slewing center 22e extending along the top-bottom direction. The slewing frame 1 supports the boom 32 and the mast 33 while allowing the boom 32 and the mast 33 to be hoisted. The slewing bearing 22 includes an outer race 22o fixed to the slewing frame 1, and an inner race 22i fixed to the lower travelling body 21 (FIG. 2). Alternatively, the outer race 22o may be fixed to the lower travelling body 21, and the inner race 22i may be fixed to the slewing frame 1. The slewing frame 1 is fixed by a plurality of bolts to an upper surface of a bearing surface plate 22a (FIG. 2) which has an annular shape and is attached to an upper surface of the slewing bearing 22, and which does not rotate. A left frame, a right frame and the like, not shown, are provided on left and right of the slewing frame 1. A cab (operator's compartment) and the like are provided on the right frame. A counterweight, not shown, which can be disassembled is provided on a rear side of the slewing frame 1. The counterweight is a weight for achieving a good balance with respect to the lifting load L of the crane 20. Additionally, the slewing frame 1 may have a configuration which allows the slewing frame 1 to be divided into front and back halves at a rear portion of the slewing bearing 22, for example.

For example, the boom 32 has a lattice structure, and is a hoisting member for lifting the lifting load L. The boom 32 is hoistably attached to the slewing frame 1, at a front end portion of the slewing frame 1 (i.e., side-plate front-end portion 3F described later).

The mast 33 is provided at a position on a rear side of the boom 32. A distal end portion of the mast 33 and a distal end portion of the boom 32 are connected to each other by a guy line 34. An upper spreader 39 provided at the distal end portion of the mast 33 and a lower spreader 7 (mast connection section) provided at a rear portion of the slewing frame 1 are connected to each other by a boom hoist rope 35 (connection member). The mast 33 is hoisted up or down by a winch (not shown) provided at the slewing frame 1 reeling in or out the boom hoist rope 35, and the boom 32 is thereby hoisted up or down.

A boom foot section 5 to which a proximal end portion of the boom 32 is attached and which supports the proximal end portion of the boom 32 is provided on a front surface portion of the slewing frame 1 (i.e., side-plate front-end portion 3F described later). A mast foot section 6 to which a proximal end portion of the mast 33 is attached and which supports the proximal end portion of the mast 33 is provided at a front side part of an upper surface of the slewing frame 1 (i.e., side-plate upper-surface portion 3T described later). The lower spreader 7 mentioned above is provided at a rear side part on the upper surface of the slewing frame 1 (i.e., rear end member 4 described later).

(Configuration of Stewing Frame)

As shown in FIG. 2, the slewing frame 1 includes a bottom plate 2 which is horizontally disposed above the slewing bearing 22. The bottom plate 2 is attached to the upper surface of the bearing surface plate 22a, which is attached to the upper surface of the slewing bearing 22. A part, of the bottom plate 2, where the bearing surface plate 22a is fixed is defined as a bearing mounting portion. The bottom plate 2 includes a bottom-plate upper-surface portion 2A, and a bottom-plate lower-surface portion 2B to which the slewing bearing 22 is fixed through the bearing surface plate 22a (FIG. 2). A rear end portion of the bottom plate 2 may be disposed near a rear end portion of the slewing bearing 22 in FIG. 3, or may be disposed to extend rearward to near a rear end portion of a seventh reinforcement member 17 described later. That is, it is sufficient if the bottom plate 2 is disposed at least above the slewing bearing 22.

The slewing frame 1 also includes a pair of left and right side plates 3. The pair of side plates 3 are provided upright on the bottom-plate upper-surface portion 2A of the bottom plate 2 while facing each other across the slewing center 22c with a predetermined gap in the left-right direction of the slewing frame 1. The pair of side plates 3 are disposed, each extending along the front-back direction of the slewing frame 1. The pair of side plates 3 each include the side-plate upper-surface portion 3T (FIG. 2), the side-plate front-end portion 3F (FIG. 2), and a side-plate rear-end portion 3B (see FIG. 4A). A lower end portion of the side plate 3 is welded to the bottom-plate upper-surface portion 2A of the bottom plate 2.

The slewing frame 1 also includes a front plate (not shown), and the rear end member 4 (see FIGS. 2, 9). The front plate is provided upright on the bottom-plate upper-surface portion 2A of the bottom plate 2, at a front side part of the slewing frame 1 in the front-back direction, and the front plate and the rear end member 4 are disposed to face each other in the front-back direction. The rear end member 4 is provided on the bottom-plate upper-surface portion 2A of the bottom plate 2, on a rear side of the crane 20 in the front-back direction, and connects rear ends of the pair of side plates 3 (i.e. side-plate rear-end portions 3B) to each other along the left-right direction. Additionally, illustration of the front plate is omitted in FIG. 2.

A pair of boom foot sections 5 are provided on front surfaces of the pair of side plates 3 (i.e., side-plate front-end portions 3F), and a pair of mast foot sections 6 are provided on upper surfaces of the pair of side plates 3 (i.e., side-plate upper-surface portions 3T) (FIG. 2). A pair of lower spreaders 7 are also provided on an upper surface of the rear end member 4.

Figure 3:
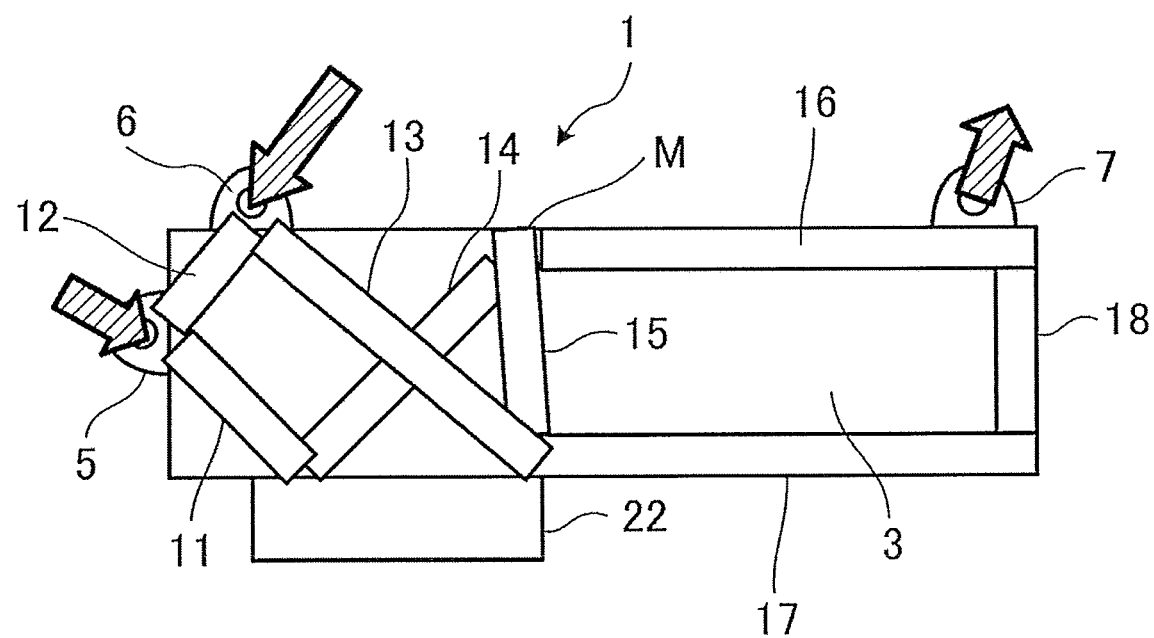
FIG. 3 is a cross-sectional view of the slewing frame as viewed from left, according to the embodiment of the present invention.
Figure 4B:
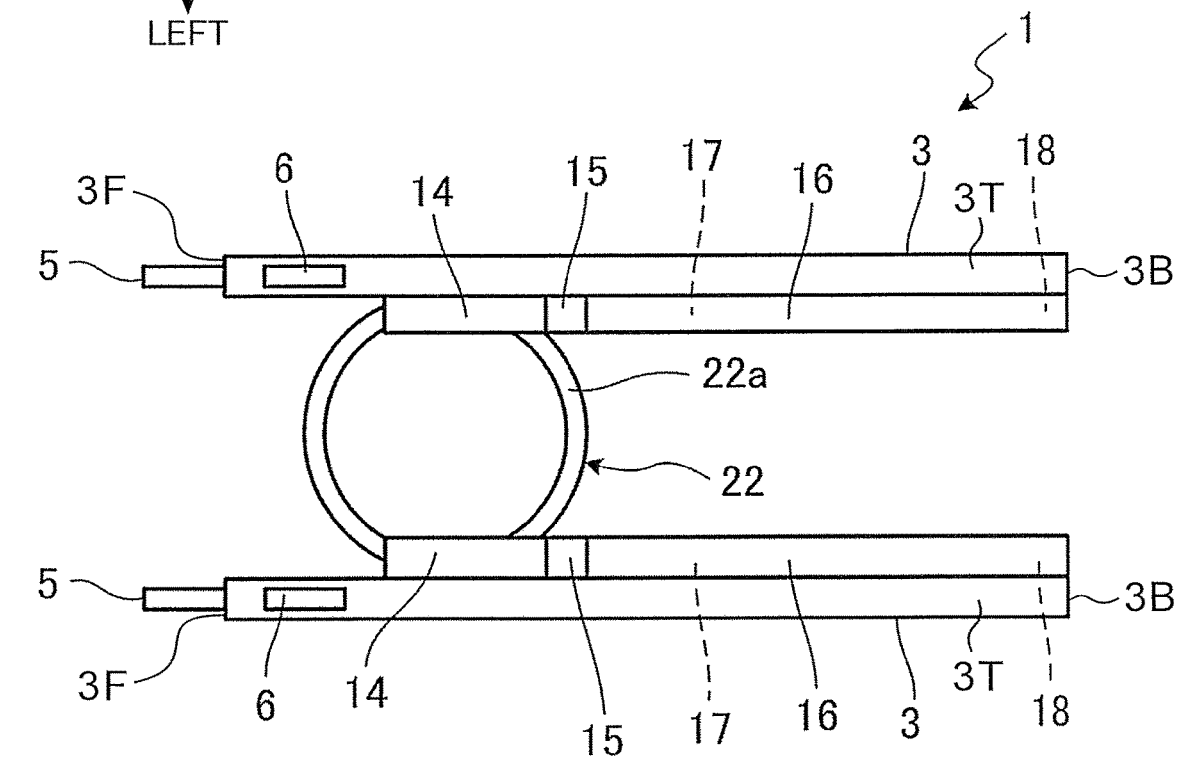
FIG. 4B is a top view of the slewing frame according to the embodiment of the present invention.

FIG. 3 is a cross-sectional view of the slewing frame 1 as viewed from left, according to the present embodiment, and is a cross-sectional view along the front-back direction and the top-bottom direction, passing through a center portion of the slewing frame 1 in the left-right direction. FIGS. 4A and 4B are top views of the slewing frame 1 according to the present embodiment. Additionally, in FIGS. 3, 4A and 4B, some members of the slewing frame 1 are omitted. Particularly, in FIGS. 3, 4A and 4B, illustration of the bottom plate 2 is omitted. As indicated by arrows in FIG. 3, the weight of the boom 32 or a lifting load weight of the lifting load L acts on the boom foot section 5, the mast foot section 6, and the lower spreader 7. These loads act downward and rearward on the boom foot section 5, act downward and forward on the mast foot section 6, and act upward on the lower spreader 7. Theses loads are transmitted from the slewing frame 1 to the slewing bearing 22.

Loads occurring due to the crane 20 taking various orientations and a load occurring due to a load lifting task act on the slewing frame 1, and cause deformation of the slewing frame 1. The deformation affects deflection of the distal end portion of the boom 32 or a distal end portion of a jib, not shown, attached at a tip of the boom 32. As a result, lifting performance of the crane 20 becomes limited.

As shown in FIGS. 3, 4A and 4B, the slewing frame 1 of the present embodiment includes a pair of left and right first reinforcement members 11, a pair of left and right second reinforcement members 12, a pair of left and right third reinforcement members 13, a pair of left and right fourth reinforcement members 14, and a pair of left and right fifth reinforcement members 15. In the present embodiment, these reinforcement members 11 to 15 are hollow tubular members, such as cylindrical tubes or rectangular tubes, made of metal, but may alternatively have a plate shape, a columnar shape or a rectangular column shape. These reinforcement members 11 to 15 may be provided at the slewing frame 1 from the start and may be integrally provided with other members, or may be attached to the slewing frame 1 at a later stage.

As shown in FIG. 3, when the slewing frame 1 is seen from a side along the left-right direction, the pair of first reinforcement members 11 are provided, each extending linearly from the boom foot sections 5 to a front side part of an upper surface portion of the slewing bearing 22 (i.e., front side part of the slewing bearing 22). As shown in FIG. 4A, the first reinforcement member 11 is disposed to link the boom foot section 5 and the front side part of the upper surface portion of the slewing bearing 22. An upper end portion (proximal end portion) of the first reinforcement member 11 is fixed to an inner surface of the side plate 3, and a lower end portion (distal end portion on a side of the slewing bearing 22) of the first reinforcement member 11 is fixed to the bottom plate 2. As a result, the lower end portion of the first reinforcement member 11 is linked to the front side part of the upper surface portion of the slewing bearing 22 through the bottom plate 2 and the bearing surface plate 22a. The lower end portions of the first reinforcement members 11 are fixed to the bottom plate 2, at positions inside the pair of left and right side plates 3 in the left-right direction with gaps to the pair of left and right side plates 3. Additionally, in another embodiment, the bearing surface plate 22a attached to the upper surface of the slewing bearing 22 may penetrate the bottom plate 2, and the lower end portions of the first reinforcement members 11 may be fixed to the bearing surface plate 22a. In still another embodiment, the bearing surface plate 22a may be provided surrounding the upper surface portion and a side surface portion of the slewing bearing 22, and the lower end portions of the first reinforcement members 11 may be linked to the upper surface portion of the slewing bearing 22 through the bottom plate 2 and the bearing surface plate 22a. Furthermore, the lower end portions of the first reinforcement members 11 do not necessarily have to be linked to the upper surface portion of the slewing bearing 22, and may alternatively be linked to the side surface portion of the slewing bearing 22. That is, it is sufficient if the slewing bearing 22 is disposed on an extension of the first reinforcement members 11. Additionally, in FIG. 4A, illustration of the bottom plate 2, the front plate, and the rear end member 4 is omitted. As fixing member of the reinforcement member, any known joining means such as bolt or welding may be used.

As shown in FIG. 3, when the slewing frame 1 is seen from the side along the left-right direction, the pair of second reinforcement members 12 are provided, each extending linearly from the boom foot section 5 to the mast foot section 6. As shown in FIG. 4A, the second reinforcement member 12 is disposed to link the boom foot section 5 and the mast foot section 6. A side surface of the second reinforcement member 12 is fixed on the inner surface of the side plate 3, from an upper end to a lower end.

As shown in FIG. 3, when the slewing frame 1 is seen from the side along the left-right direction, the pair of third reinforcement members 13 are provided, each extending linearly from the mast foot section 6 to a rear side part of the upper surface portion of the slewing bearing 22 (i.e., rear side part of the slewing bearing 22). As shown in FIG. 4A, the third reinforcement member 13 is disposed to link the mast foot section 6 and the rear side part of the upper surface portion of the slewing bearing 22. An upper end portion (proximal end portion) of the third reinforcement member 13 is fixed to the inner surface of the side plate 3, and a lower end portion (distal end portion on the side of the slewing bearing 22) of the third reinforcement member 13 is fixed to the bottom plate 2. As a result, the lower end portion of the third reinforcement member 13 is linked to the rear side part of the upper surface portion of the slewing bearing 22 through the bottom plate 2 and the bearing surface plate 22a. The lower end portions of the third reinforcement members 13 are fixed to the bottom plate 2, at positions inside the pair of left and right side plates 3 in the left-right direction with gaps to the pair of left and right side plates 3. Additionally, in another embodiment, the bearing surface plate 22a may penetrate the bottom plate 2, and the lower end portions of the third reinforcement members 13 may be fixed to the bearing surface plate 22a. In still another embodiment, the bearing surface plate 22a may be provided surrounding the upper surface portion and the side surface portion of the slewing bearing 22, and the lower end portions of the third reinforcement members 13 may be linked to the upper surface portion of the slewing bearing 22 through the bottom plate 2 and the bearing surface plate 22a. Furthermore, the lower end portions of the third reinforcement members 13 do not necessarily have to be linked to the upper surface portion of the slewing bearing 22, and may alternatively be linked to the side surface portion of the slewing bearing 22. That is, it is sufficient if the slewing bearing 22 is disposed on an extension of the third reinforcement members 13.

As shown in FIG. 3, when the slewing frame 1 is seen from the side along the left-right direction, the pair of fourth reinforcement members 14 are provided, each extending linearly from a middle region M of the slewing frame 1 to the front side part of the upper surface portion of the slewing bearing 22 (i.e., front side part of the slewing bearing 22). The middle region M of the slewing frame 1 is a region located at an upper end portion of the slewing frame 1 (near the side-plate upper-surface portion 3T), and located above the rear end portion of the slewing bearing 22. As shown in FIG. 4B, the fourth reinforcement member 14 is disposed to link the middle region M and the front side part of the upper surface portion of the slewing bearing 22 (i.e., front side part of the slewing bearing 22). A side surface of the fourth reinforcement member 14 is fixed to the inner surface of the side plate 3, from an upper end to a lower end. A lower end portion of the fourth reinforcement member 14 (distal end portion on the side of the slewing bearing 22) is fixed to the bottom plate 2. As a result, the lower end portion of the fourth reinforcement member 14 is linked to the front side part of the upper surface portion of the slewing bearing 22 through the bottom plate 2 and the bearing surface plate 22a. Additionally, in another embodiment, the bearing surface plate 22a may penetrate the bottom plate 2, and the lower end portion of the fourth reinforcement member 14 may be fixed to the bearing surface plate 22a. Additionally, in FIG. 4B, illustration of the bottom plate 2, the front plate, and the rear end member 4 is omitted. In still another embodiment, the bearing surface plate 22a may be provided surrounding the upper surface portion and the side surface portion of the slewing bearing 22, and the lower end portion of the fourth reinforcement member 14 may be linked to the upper surface portion of the slewing bearing 22 through the bottom plate 2 and the bearing surface plate 22a. Furthermore, the lower end portion of the fourth reinforcement member 14 does not necessarily have to be linked to the upper surface portion of the slewing bearing 22, and may alternatively be linked to the side surface portion of the slewing bearing 22. That is, it is sufficient if the slewing bearing 22 is disposed on an extension of the fourth reinforcement member 14.

As shown in FIG. 3, when the slewing frame 1 is seen from the side along the left-right direction, the pair of fifth reinforcement members 15 are provided, each extending linearly from the middle region M to the rear side part of the upper surface portion of the slewing bearing 22 (i.e., rear side part of the slewing bearing 22). As shown in FIG. 4B, the fifth reinforcement member 15 is disposed to link the middle region M and the rear side part of the upper surface portion of the slewing bearing 22. A side surface of the fifth reinforcement member 15 is fixed to the inner surface of the side plate 3, from an upper end to a lower end. Additionally, a lower end portion of the fifth reinforcement member 15 may be fixed to the bottom plate 2, or may be fixed to a front end portion of the seventh reinforcement member 17 described later. In either case, the lower end portion of the fifth reinforcement member 15 is linked to the upper surface portion of the slewing bearing 22 at least through the bottom plate 2 and the bearing surface plate 22a. In still another embodiment, the bearing surface plate 22a may be provided surrounding the upper surface portion and the side surface portion of the slewing bearing 22, and the lower end portion of the fifth reinforcement member 15 may be linked to the upper surface portion of the slewing bearing 22 through the bottom plate 2 and the bearing surface plate 22a. Furthermore, the lower end portion of the fifth reinforcement member 15 does not necessarily have to be linked to the upper surface portion of the slewing bearing 22, and may alternatively be linked to the side surface portion of the slewing bearing 22. That is, it is sufficient if the slewing bearing 22 is disposed on an extension of the fifth reinforcement member 15.

Due to the weight of the boom 32 or the lifting load L, a compression load acts on a part between the boom foot section 5 and the front side part of the upper surface portion of the slewing bearing 22. However, since rigidity of the part is increased by the first reinforcement member 11, deformation at the part is suppressed. At this time, a compression load acts on a part between the boom foot section 5 and the mast foot section 6. However, since rigidity of the part is increased by the second reinforcement member 12, deformation at the part is suppressed. Also at this time, a tensile load acts on a part between the mast foot section 6 and the rear side part of the upper surface portion of the slewing bearing 22. However, since rigidity of the part is increased by the third reinforcement member 13, deformation at the part is suppressed.

Also at this time, a compression load acts on a part between the middle region M and the front side part of the upper surface portion of the slewing bearing 22. However, since rigidity of the part is increased by the fourth reinforcement member 14, deformation at the part is suppressed. Also at this time, a tensile load acts on a part between the middle region M and a rear portion of the upper surface of the slewing bearing 22. However, since rigidity at the part is increased by the fifth reinforcement member 15, deformation at the part is suppressed.

In this manner, according to the present embodiment, deformation of the slewing frame 1 can be suppressed while a load acting on the slewing frame 1 is stably transmitted to the front side part and the rear side part of the slewing bearing 22, and thus, lifting performance of the crane 20 can be increased. At this time, rigidity of parts where the loads act is efficiently increased by the five reinforcement members 11 to 15, and an increase in the weight due to addition of the reinforcement members 11 to 15 can be minimized. Accordingly, the lifting performance of the crane 20 can be increased while suppressing an increase in the weight.

As shown in FIGS. 3 and 4B, the slewing frame 1 also includes a pair of left and right sixth reinforcement members 16, a pair of left and right seventh reinforcement members 17, and a pair of left and right eighth reinforcement members 18. In the present embodiment, these reinforcement members 16 to 18 are hollow tubular members, such as cylindrical tubes or rectangular tubes, made of metal, but may alternatively have a plate shape, a columnar shape or a rectangular column shape. These reinforcement members 16 to 18 may be provided at the slewing frame 1 from the start and may be integrally provided with other members, or may be attached to the slewing frame 1 at a later stage.

As shown in FIG. 3, when the slewing frame 1 is seen from the side along the left-right direction, the pair of sixth reinforcement members 16 are provided, each extending linearly from the middle region M to an upper portion of a rear surface portion of the slewing frame 1 (i.e., an upper side part of the rear end member 4). As shown in FIGS. 3 and 4B, the sixth reinforcement member 16 is disposed to link the middle region M and the upper portion of the rear surface portion of the slewing frame 1 (i.e., upper side part of the rear end member 4). A side surface of the sixth reinforcement member 16 is fixed to the inner surface of the side plate 3, from a front end to a rear end. More preferably, when the slewing frame 22 is seen along the left-right direction, the pair of sixth reinforcement members 16 are each disposed extending from an upper end portion of the middle region M toward an upper end portion of the rear end member 4, and disposed to link the middle region M and the upper end portion of the rear end member 4.

As shown in FIG. 3, when the slewing frame 1 is seen from the side along the left-right direction, the pair of seventh reinforcement members 17 are provided at positions below the sixth reinforcement members 16, each seventh reinforcement member 17 extending linearly from a position above the rear side part of the slewing bearing 22 to a lower portion of the rear surface portion of the slewing frame 1 (i.e., lower side part of the rear end member 4). In FIG. 4B, the seventh reinforcement member 17 is positioned further away from the plane of the figure than the sixth reinforcement member 16, and is disposed to link, along a horizontal direction, a position, on the side plate 3, below the sixth reinforcement member 16 and above the slewing bearing 22, and the lower side part of the rear end member 4. A side surface of the seventh reinforcement member 17 is fixed to the inner surface of the side plate 3, from a front end to a rear end. At least the front end portion of the seventh reinforcement member 17 is fixed to the bottom plate 2. Additionally, in the case where the bottom plate 2 extends to a rear end portion of the slewing frame 1, a lower surface portion of the seventh reinforcement member 17 may be fixed to the bottom plate 2 along the front-back direction. In the case where the bottom plate 2 does not extend to the rear end portion of the slewing frame 1, a beam member that connects the pair of side plates 3 may be disposed instead of the bottom plate 2. More preferably, when the slewing frame 1 is seen along the left-right direction, the pair of seventh reinforcement members 17 are each disposed extending from a position below the sixth reinforcement member 16 and above the rear side part of the slewing bearing 22 toward a lower end portion of the rear end member 4, and disposed to link a position, on the side plate 3, below the sixth reinforcement member 16 and above the rear side part of the slewing bearing 22 and the lower end portion of the rear end member 4.

As shown in FIG. 3, when the slewing frame 1 is seen from the side along the left-right direction, the pair of eighth reinforcement members 18 are provided, each extending linearly, along the top-bottom direction, from an upper side part of the rear surface portion of the slewing frame 1 (i.e., upper side part of the rear end member 4) to a lower side part of the rear surface portion of the slewing frame 1 (i.e., lower side part of the rear end member 4). In FIG. 4B, the eighth reinforcement member 18 is positioned further away from the plane of the figure than the sixth reinforcement member 16 while extending in a direction perpendicular to the plane of the figure, and is disposed to link the upper side part of the rear surface portion of the slewing frame 1 and the lower side part of the rear surface portion of the slewing frame 1. A side surface of the eighth reinforcement member 18 is fixed to the inner surface of the side plate 3, from an upper end to a lower end. A rear surface portion of the eighth reinforcement member 18 is fixed to a front surface of the rear end member 4. More preferably, when the slewing frame 22 is seen along the left-right direction, the eighth reinforcement member 18 is fixed to the rear end member 4 so as to extend in the top-bottom direction, and is disposed to link the upper end portion and the lower end portion of the rear end member 4.

As shown in FIG. 3, due to the lifting load L, an upward force acts on the lower spreader 7. A compression load thereby acts on a part, along the horizontal direction, between the middle region M and the upper side part of the rear surface portion of the slewing frame 1. However, since the rigidity of the part is increased by the sixth reinforcement member 16, deformation of the part is suppressed. Also at this time, a tensile load acts on a part, along the horizontal direction, between the rear side part of the upper surface portion of the slewing bearing 22 and the lower side part of the rear surface portion of the slewing frame 1. However, since the rigidity of the part is increased by the seventh reinforcement member 17, deformation of the part is suppressed. Also at this time, a tensile load acts on a part, along the top-bottom direction, between the upper side part of the rear surface portion of the slewing frame 1 and the lower side part of the rear surface portion of the slewing frame 1. However, since the rigidity of the part is increased by the eighth reinforcement member 18, deformation of the part is suppressed.

When there is no lifting load L, a downward force acts on the rear portion of the slewing frame 1 due to the counterweight. A tensile load thereby acts on a part, along the horizontal direction, between the middle region M and the upper side part of the rear surface portion of the slewing frame 1. However, since the rigidity of the part is increased by the sixth reinforcement member 16, deformation of the part is suppressed. Also at this time, a compression load acts on a part, along the horizontal direction, between the rear side part of the upper surface portion of the slewing bearing 22 and the lower side part of the rear surface portion of the slewing frame 1. However, since the rigidity of the part is increased by the seventh reinforcement member 17, deformation of the part is suppressed. Also at this time, a tensile load acts on a part, along the top-bottom direction, between the upper side part of the rear surface portion of the slewing frame 1 and the lower side part of the rear surface portion of the slewing frame 1. However, since the rigidity of the part is increased by the eighth reinforcement member 18, deformation of the part is suppressed.

In this manner, according to the present embodiment, deformation of the slewing frame 1 can be further suppressed while loads acting on the slewing frame 1 are stably transmitted to the front side part and the rear side part of the slewing bearing 22, and thus, lifting performance of the crane 20 can be further increased. At this time, the rigidity of parts where the loads act is efficiently increased by the three reinforcement members 16 to 18, and an increase in the weight due to addition of the reinforcement members 16 to 18 can be minimized.

Furthermore, as shown in FIG. 3, according to the present embodiment, the third reinforcement member 13 and the fourth reinforcement member 14 are joined at a part (intersection portion) where the third reinforcement member 13 and the fourth reinforcement member 14 intersect when the slewing frame 1 is seen along the left-right direction. By joining the third reinforcement member 13 and the fourth reinforcement member 14, the rigidity of the slewing frame 1 at the joined part can be further increased. Deformation of the slewing frame 1 can thereby be further suppressed, and the lifting performance of the crane 20 can be further increased.

(Modifications)

Figure 5:
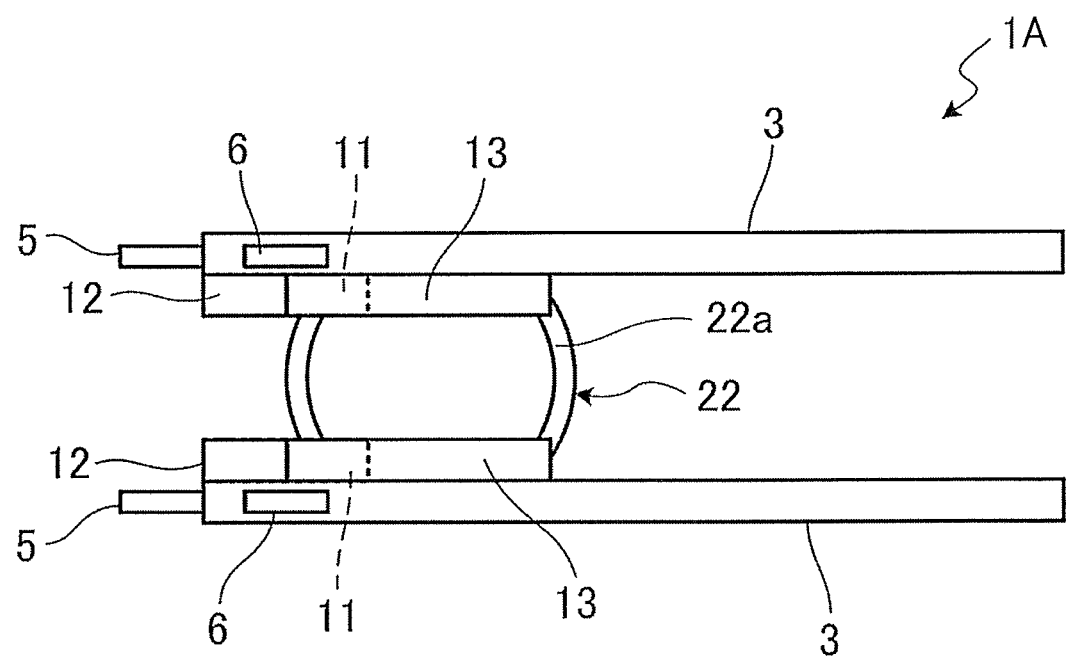
FIG. 5 is a top view of a slewing frame according to a first modification of the present invention.

Next, modifications of the present invention will be described. FIG. 5 is a top view of a slewing frame 1A according to a first modification of the present invention. Additionally, in FIG. 5, illustration of the front plate, the bottom plate, and the rear end member is omitted. In FIGS. 4A and 4B, the side plates 3 are positioned outside the slewing bearing 22 in the left-right direction, but as shown in FIG. 5, in the first modification, the side plates 3 are positioned above left and right end portions of the slewing bearing 22. Side surfaces of the pair of third reinforcement members 13 are fixed on respective inner surfaces of the pair of side plates 3, from upper ends to lower ends. As in the embodiment described above, the lower end portions of the third reinforcement members 13 are fixed to the bottom plate 2. The pair of first reinforcement members 11 are positioned further away from the plane of the figure than the pair of second reinforcement members 12 and the pair of third reinforcement members 13. Side surfaces of the first reinforcement member 11 are also fixed on the inner surfaces of the side plates 3, from upper ends to lower ends. As in the embodiment described above, the lower end portions of the first reinforcement members 11 are fixed to the bottom plate 2. Additionally, as in the embodiment described above, the bearing surface plate 22a may penetrate the bottom plate 2, and the lower end portions of the first reinforcement members 11 and the third reinforcement members 13 may each be fixed to the bearing surface plate 22a.

FIG. 6 is a top view of a slewing frame 1B according to a second modification of the present invention. Additionally, in FIG. 6, illustration of the front plate, the bottom plate, and the rear end member is omitted. As shown in FIG. 6, in the second modification, the side plates 3 are positioned inside left and right end portions of the slewing bearing 22. The pair of third reinforcement members 13 are disposed on outer surface sides of the pair of side plates 3, and side surfaces of the third reinforcement member 13 are fixed to outer surface portions of the side plates 3, from upper ends to lower ends. As in the embodiment described above, the lower end portions of the third reinforcement members 13 are fixed to the bottom plate 2. The pair of first reinforcement members 11 are also disposed on the outer surface sides of the pair of side plates 3, and the side surfaces of the first reinforcement members 11 are fixed to the outer surface portions of the side plates 3, from upper ends to lower ends. As in the embodiment described above, the lower end portions of the first reinforcement members 11 are fixed to the bottom plate 2. The fourth to the eighth reinforcement members 14 to 18 are also fixed to the outer surfaces of the side plates 3. In this case, the non-illustrated rear end member 4 (see FIG. 9) may be disposed to protrude outward in the left-right direction with respect to the pair of side plates 3, and rear end portions of the sixth reinforcement members 16 and the seventh reinforcement members 17 and the rear surface portions of the eighth reinforcement members 18 may each be fixed to the rear end member 4.

Depending on the position of the side plate 3 with respect to the slowing bearing 22, the reinforcement members 11 to 18 may be provided on the inner surface side and the outer surface side of the side plate 3. In this case, the reinforcement members 11 to 18 may be fixed to the inner surface and the outer surface of the side plate 3. One or some of the reinforcement members 11 to 18 may be disposed separately from the side plate 3. The first reinforcement member 11, the third reinforcement member 13, the fourth reinforcement member 14, and the seventh reinforcement member 17 do not necessarily have to be fixed to the bottom plate 2, and may alternatively be fixed to the side plate 3 so as to be in contact with the bottom plate 2. The lower end portion of the fifth reinforcement member 15 may be fixed to the side plate 3 so as to be in contact with the bottom plate 2.

(Frame Deformation Evaluation)

Figure 7B:
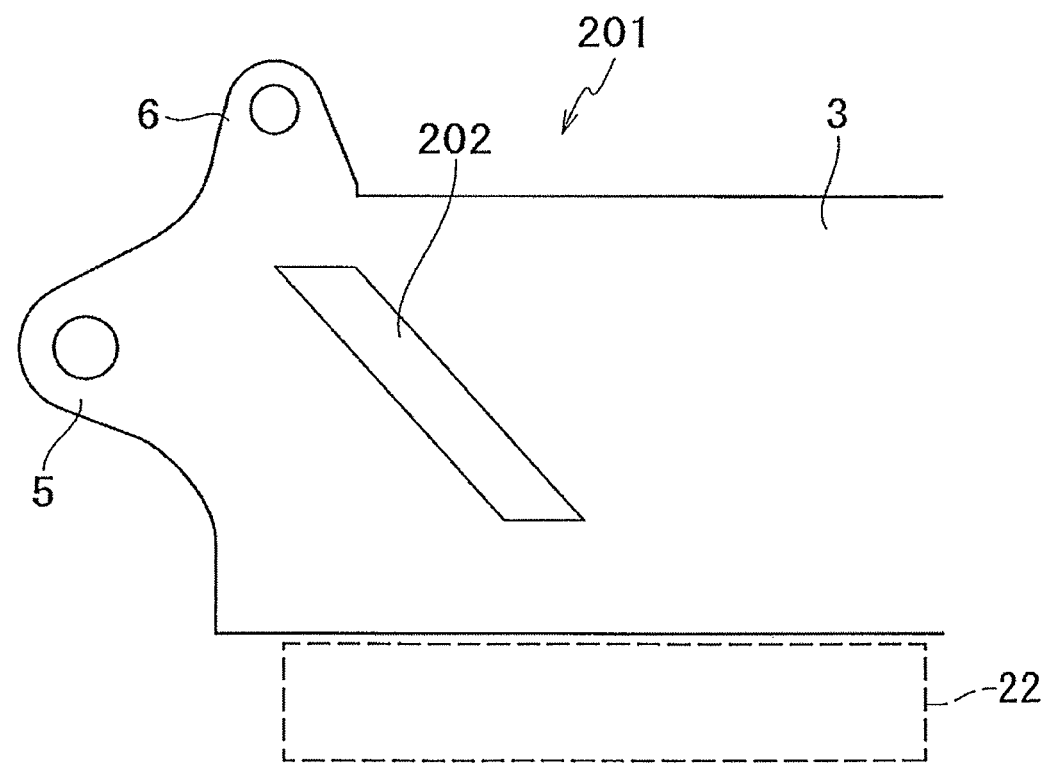
FIG. 7B is an enlarged side view of a slowing frame having a conventional structure.

Deformation of the slewing frame 1 of the present embodiment and deformation of a conventional slewing frame (conventional structure) 201 were evaluated by simulation. FIG. 7A is an enlarged side view of the slewing frame 1 according to the embodiment of the present invention. FIG. 7B is an enlarged side view of the slewing frame 201 having a conventional structure. As shown in FIG. 7A, the slewing frame 1 according to the present embodiment used for the evaluation includes the first to the fifth reinforcement members 11 to 15 which are fixed to the outer surface of the side plate 3, among the first to the eighth reinforcement members 11 to 18. As shown in FIG. 7B, the frame 201 having a conventional structure used for the evaluation includes a reinforcement member 202 which is fixed to the outer surface of the side plate 3, and which is provided extending linearly from the mast foot section 6 to a center portion of the slewing bearing 22. In the simulation evaluation, a total weight of the first to the fifth reinforcement members 11 to 15 in the present embodiment and a total weight of the reinforcement member 202 of the conventional structure 201 were set to be the same.

Evaluation was performed under a condition under which a boom compression force becomes the maximum (Condition 1), and a condition under which a hoist rope tension becomes the maximum (Condition 2). The condition under which a boom compression force becomes the maximum (Condition 1) is a condition under which an axial force generated at the boom 32 by the lifting load L becomes the maximum, and the load acting on the boom foot section 5 becomes the maximum. The condition under which a hoist rope tension becomes the maximum (Condition 2) is a condition under which a moment which causes the upper slewing body 23 to tilt forward when the lifting load L is lifted is maximized, and the entire slewing frame is subjected to maximum bending.

FIG. 8A is a side view of the slewing frame, showing magnitudes and angles of loads acting on the boom foot section 5, the mast foot section 6, and the lower spreader 7 under Condition 1. FIG. 8B is a side view of the slewing frame, showing magnitudes and angles of loads acting on the boom foot section 5, the mast foot section 6, and the lower spreader 7 under Condition 2. FIG. 9 is a perspective view of the slewing frame, showing measurement points for evaluation.

As shown in FIG. 9, a measurement point A was set at the left boom foot section 5, a measurement point B at the right boom foot section 5, a measurement point C at the right lower spreader 7, and a measurement point D at the left lower spreader 7, and displacement in the left-right direction (x-direction) and displacement in the front-back direction (y-direction) at each measurement point were evaluated. Evaluation results are shown in Table 1.

members 12 are provided, each extending from the boom foot section 5 toward the mast foot section 6, and the third reinforcement members 13 are provided, each extending from the mast foot section 6 toward the rear side part of the slewing bearing 22. Furthermore, the fourth reinforcement members 14 are provided, each extending from the middle region M, of the side-plate upper-surface portion 3T of the slewing frame 1, located above the rear end portion of the slewing bearing 22, toward the front side part of the slewing bearing 22, and the fifth reinforcement members 15 are provided, each extending from the middle region M toward the rear side part of the slewing bearing 22. The first reinforcement members 11 are each disposed to link the boom foot section 5 and the front side part of the slewing bearing 22, the second reinforcement members 12 are each disposed to link the boom foot section 5 and the mast foot section 6, and the third reinforcement members 13 are each disposed to link the mast foot section 6 and the rear side part of the slewing bearing 22. The fourth reinforcement members 14 are each disposed to link the middle region M and the front side part of the slewing bearing 22, and the fifth reinforcement members 15 are each disposed to link the middle region M and the rear side part of the slewing bearing 22.

Due to the weight of the boom 32 or the lifting load L, a compression load acts on a part between the boom foot section 5 and the front side part of the slewing bearing 22. However, since the rigidity of the part is increased by the first reinforcement member 11, deformation at the part is suppressed. Also at this time, a compression load acts on a part between the boom foot section 5 and the mast foot section 6. However, since the rigidity of the part is increased by the second reinforcement member 12, deformation at the part is suppressed. Also at this time, a tensile load acts on a part between the mast foot section 6 and the rear side part of the slewing bearing 22. However, since the rigidity of the part is increased by the third reinforcement member 13, deformation at the part is suppressed. Also at this time, a compression load acts on a part between the middle region M and the front side part of the slewing bearing 22.

TABLE 1

| | | Conventional Structure | | | Present Embodiment | | | Reduction Rate |
|---|---|---|---|---|---|---|---|---|
| | Measurement Point | Displacement x | Displacement y | Displacement ($\sqrt{x^2+y^2}$) | Displacement x | Displacement y | Displacement ($\sqrt{x^2+y^2}$) | of Displacement (%) |
| Condition 1 | A | −4.0 | 23.2 | 23.5 | −3.2 | 22.3 | 22.5 | 4.1 |
| | B | 1.4 | 23.2 | 23.2 | 0.7 | 22.3 | 22.3 | 3.8 |
| | C | −1.3 | 43.2 | 43.2 | −1.3 | 41.3 | 41.3 | 4.5 |
| | D | −1.3 | 43.2 | 43.2 | −1.3 | 41.3 | 41.3 | 4.5 |
| Condition 2 | A | −0.1 | 22.7 | 22.7 | −0.2 | 21.7 | 21.7 | 4.2 |
| | B | −2.0 | 22.7 | 22.8 | −1.9 | 21.7 | 21.8 | 4.4 |
| | C | −1.2 | 66.4 | 66.4 | −1.3 | 64.0 | 64.1 | 3.6 |
| | D | −1.3 | 66.4 | 66.4 | −1.3 | 64.0 | 64.1 | 3.6 |

It can be seen from Table 1 that, compared to the conventional structure 201, deformation of the slewing frame 1 of the present embodiment is suppressed by 3.8% to 4.5% under Condition 1, and 3.6% to 4.4% under Condition 2.

(Effects)

As described above, with the slewing frame 1, 1A, and 1B according to the present invention, when the slewing frame 1 is seen from the side along the left-right direction, the pair of first reinforcement members 11 are provided, each extending from the boom foot section 5 to the front side part of the slewing bearing 22, and the second reinforcement However, since the rigidity of the part is increased by the fourth reinforcement member 14, deformation at the part is suppressed. Also at this time, a tensile load acts on a part between the middle region M and the rear side part of the slewing bearing 22. However, since the rigidity of the part is increased by the fifth reinforcement member 15, deformation at the part is suppressed.

Since deformation of the slewing frame 1 can be suppressed in the above manner, the lifting performance of the crane 20 can be increased. At this time, rigidity of parts where the loads act is efficiently increased by the five reinforcement members 11 to 15, and an increase in the weight due to addition of the reinforcement members 11 to 15 can be minimized. Accordingly, the lifting performance of the crane 20 can be increased while suppressing an increase in the weight.

When the slewing frame 1 is seen from the side along the left-right direction, the sixth reinforcement member 16 is provided from the middle region M to an upper side part of the rear surface portion of the slewing frame 1, the seventh reinforcement member 17 is provided from the rear side part of the upper surface portion of the slewing bearing 22 to the lower side part of the rear surface portion of the slewing frame 1, and the eighth reinforcement member 18 is provided from the upper side part of the rear surface portion of the slewing frame 1 to the lower side part of the rear surface portion of the slewing frame 1. The sixth reinforcement member 16 is disposed to link the middle region M and the upper side part of the rear surface portion of the slewing frame 1, the seventh reinforcement member 17 is disposed to link the rear side part of the upper surface portion of the slewing bearing 22 and the lower side part of the rear surface portion of the slewing frame 1, and the eighth reinforcement member 18 is disposed to link the upper side part of the rear surface portion of the slewing frame 1 and the lower side part of the rear surface portion of the slewing frame 1.

Due to the lifting load L, an upward force acts on the lower spreader 7. A compression load thereby acts on a part between the middle region M and the upper side part of the rear surface portion of the slewing frame 1. However, since the rigidity of the part is increased by the sixth reinforcement member 16, deformation of the part is suppressed. Also at this time, a tensile load acts on a part between the rear side part of the upper surface portion of the slewing bearing 22 and the lower side part of the rear surface portion of the slewing frame 1. However, since the rigidity of the part is increased by the seventh reinforcement member 17, deformation of the part is suppressed. Also at this time, a tensile load acts on a part between the upper side part of the rear surface portion of the slewing frame 1 and the lower side part of the rear surface portion of the slewing frame 1. However, since the rigidity of the part is increased by the eighth reinforcement member 18, deformation of the part is suppressed.

When there is no lifting load L, a downward force acts on the rear portion of the slewing frame 1 due to the counterweight. A tensile load thereby acts on a part between the middle region M and the upper side part of the rear surface portion of the slewing frame 1. However, since the rigidity of the part is increased by the sixth reinforcement member 16, deformation of the part is suppressed. Also at this time, a compression load acts on a part between the rear side part of the upper surface portion of the slewing bearing 22 and the lower side part of the rear surface portion of the slewing frame 1. However, since the rigidity of the part is increased by the seventh reinforcement member 17, deformation of the part is suppressed. Also at this time, a tensile load acts on a part between the upper side part of the rear surface portion of the slewing frame 1 and the lower side part of the rear surface portion of the slewing frame 1. However, since the rigidity of the part is increased by the eighth reinforcement member 18, deformation of the part is suppressed.

In this manner, deformation of the slewing frame 1 can be further suppressed, and thus, the lifting performance of the crane 20 can be further increased. At this time, the rigidity of parts where the loads act is efficiently increased by the three reinforcement members 16 to 18, and an increase in the weight due to addition of the reinforcement members 16 to 18 can be minimized.

Furthermore, by joining the third reinforcement member 13 and the fourth reinforcement member 14 at a part (intersection portion) where the third reinforcement member 13 and the fourth reinforcement member 14 intersect, the rigidity of the slewing frame 1 at the joined part can be further increased. Deformation of the slewing frame 1 can thereby be further suppressed, and the lifting performance of the crane 20 can be further increased.

Heretofore, an embodiment of the present invention has been described, but the embodiment is merely for illustrative purposes and is not intended to limit the present invention. Designs of specific configurations can be modified as appropriate. Operations and effects described in the embodiment of the present invention are merely cited as the most preferred operations and effects attainable by the present invention, and the operations and effects of the present invention are not limited to those described in the embodiment of the present invention.

Figure 10:
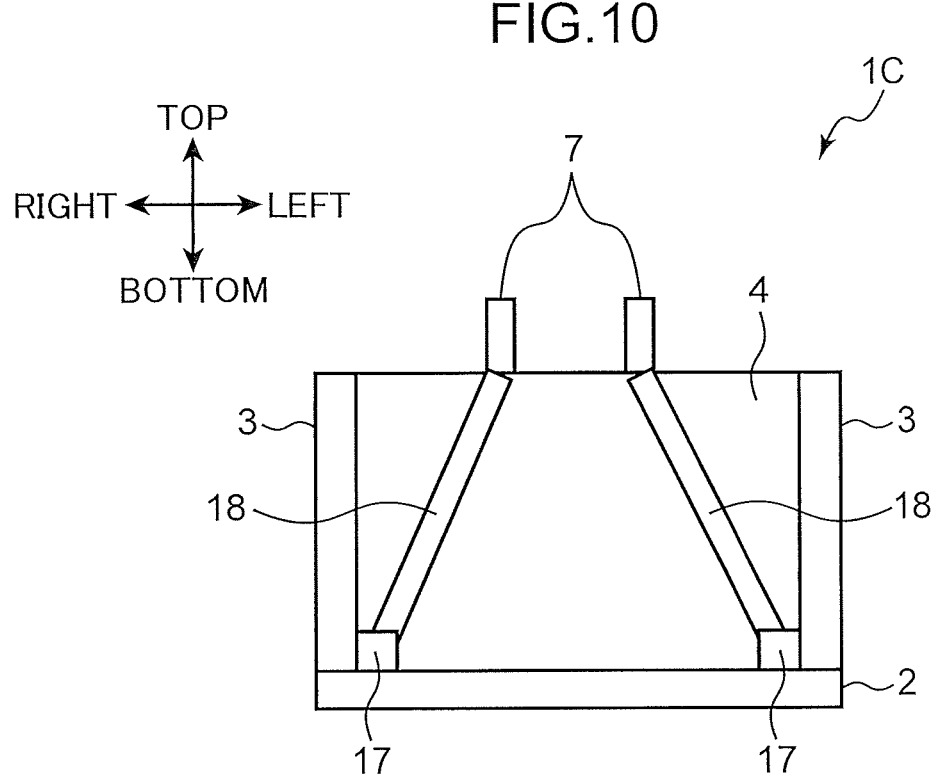
FIG. 10 is a cross-sectional view of a slewing frame according to a third modification of the present invention.

FIG. 10 is a cross-sectional view of a slewing frame 1C according to a third modification of the present invention. In the present modification, one pair of seventh reinforcement members 17 are disposed extending in the front-back direction, at corner portions where the pair of side plates 3 intersect with the bottom plate 2. The rear end portions of the seventh reinforcement members 17 are fixed on an inner surface of the rear end member 4. One pair of eighth reinforcement members 18 are also fixed on the inner surface of the rear end member 4. Upper end portions of the pair of eighth fixing members 18 are disposed near the pair of lower spreaders 7 (mast connection sections), respectively. Lower end portions of the pair of eighth reinforcement members 18 are connected to the respective seventh reinforcement members 17, which are disposed at the corner portions. As a result, the pair of eighth reinforcement members are inclined so as to extend downward and outward in the left-right direction from the lower spreaders 7. Also with such a configuration, force acting on the lower spreaders 7 can be stably transmitted to the side of the bottom plate 2. The eighth reinforcement member 18 may be disposed to link the upper side part and the lower side part of the rear end member 4.

The eighth reinforcement member 18 in the embodiment and the modifications described above may alternatively be fixed to a rear side surface of the rear end member 4. With reference to FIG. 9, the rear end member 4 may have a box shape having a front wall and a rear wall which are disposed with a gap in the front-back direction. In FIG. 9, a pair of lower spreaders 7 are fixed to the upper surface portion of the box-shaped rear end member 4. In this case, the eighth reinforcement member 18 may be disposed on a front surface portion of the front wall, a rear surface portion of the rear wall, or inside the box-shaped rear end member 4, on a rear surface portion of the front wall or a front surface portion of the rear wall. Furthermore, the eighth reinforcement member 18 may be disposed inside the box-shaped rear end member 4, so as to fill a space between the front wall and the rear wall.

Although it is sufficient if an upper end portion of the fourth reinforcement member 14 in the embodiment and the modifications described above is disposed to be included in the middle region M, as shown in FIG. 3, the upper end portion is preferably disposed extending to an upper end surface of the slewing frame 1 (i.e., side-plate upper-surface portion 3T). The upper end portion of the fourth reinforcement member 14 and an upper end portion of the fifth reinforcement member 15 are more preferably connected to each other so that a force is easily transmitted between the reinforcement members.

The invention claimed is:

1. A slewing frame for a work machine, the slewing frame being supported, through a slewing bearing, on a lower travelling body of the work machine to slew around a slewing center extending in a top-down direction, and supporting a mast and a boom, the slewing frame comprising:
   a bottom plate including a bottom-plate upper-surface portion, and a bottom-plate lower-surface portion to which the slewing bearing is fixed;
   a pair of left and right side plates disposed on the bottom-plate upper-surface portion, extending along a front-back direction of the slewing frame, and facing each other in a left-right direction of the slewing frame across the slewing center, each of the pair of left and right side plates including a side-plate upper-surface portion, a side-plate front-end portion, and a side-plate rear-end portion;
   a rear end member connecting the side-plate rear-end portions of the pair of left and right side plates in the left-right direction;
   a pair of boom foot sections provided at the side-plate front-end portions of the pair of left and right side plates, respectively, and supporting a proximal end portion of the boom;
   a pair of mast foot sections provided at front side parts of the side-plate upper-surface portions of the pair of left and right side plates, respectively, and supporting a proximal end portion of the mast;
   a mast connection section provided at the rear end member, and connected to the mast through a connection member;
   a pair of left and right first reinforcement members, each disposed extending from one of the boom foot sections toward a front side part of the slewing bearing, when the slewing frame is seen along the left-right direction, and each including a lower end portion linked to the front side part of the slewing bearing;
   a pair of left and right second reinforcement members, each disposed extending from one of the boom foot sections toward one of the mast foot sections, when the slewing frame is seen along the left-right direction;
   a pair of left and right third reinforcement members, each disposed extending from one of the mast foot sections toward a rear side part of the slewing bearing, when the slewing frame is seen along the left-right direction, and each including a lower end portion linked to the rear side part of the slewing bearing;
   a pair of left and right fourth reinforcement members, each disposed extending from a middle region, of an upper portion of one of the side plates, located above the rear side part of the slewing bearing, toward the front side part of the slewing bearing, when the slewing frame is seen along the left-right direction, and each including a lower end portion linked to the front side part of the slewing bearing; and
   a pair of left and right fifth reinforcement members, each disposed extending from the middle region toward the rear side part of the slewing bearing, when the slewing frame is seen along the left-right direction, and each including a lower end portion linked to the rear side part of the slewing bearing.

2. The slewing frame for a work machine according to claim 1, wherein the lower end portion of each of the pair of first reinforcement members, the pair of third reinforcement members, and the pair of fourth reinforcement members are each fixed to the bottom plate, and are linked to the slewing bearing through the bottom plate.

3. The slewing frame for a work machine according to claim 2,
   wherein the lower end portions of the pair of first reinforcement members and the pair of third reinforcement members are each fixed to the bottom plate, at a position inside one of the pair of left and right side plates in the left-right direction with a gap to the one of the pair of left and right side plates, and
   wherein upper end portions, of the pair of first reinforcement members and the pair of third reinforcement members, opposite the lower end portions are each fixed to one of the pair of left and right side plates.

4. The slewing frame for a work machine according to claim 2, wherein the lower end portions of the pair of fifth reinforcement members are each fixed to the bottom plate, and linked to the slewing bearing through the bottom plate.

5. The slewing frame for a work machine according to claim 2, wherein the lower end portions of the pair of first reinforcement members, the pair of third reinforcement members, and the pair of fourth reinforcement members are each linked to an upper surface portion of the slewing bearing.

6. The slewing frame for a work machine according to claim 4, wherein the lower end portions of the pair of fifth reinforcement members are each linked to an upper surface portion of the slewing bearing.

7. The slewing frame for a work machine according to claim 1, further comprising:
   a pair of left and right sixth reinforcement members, each disposed extending from the middle region toward an upper side part of the rear end member, and each disposed to link the middle region and the upper side part of the rear end member, when the slewing frame is seen along the left-right direction;
   a pair of left and right seventh reinforcement members, each disposed extending from a position below the sixth reinforcement members and above the rear side part of the slewing bearing, toward a lower side part of the rear end member, and each disposed to link the lower side part of the rear end member and a position, on one of the side plates, below the sixth reinforcement members and above the rear side part of the slewing bearing, when the slewing frame is seen along the left-right direction; and
   an eighth reinforcement member fixed to the rear end member, extending along a top-bottom direction, and disposed to link the upper side part and the lower side part of the rear end member, when the slewing frame is seen along the left-right direction.

8. The slewing frame for a work machine according to claim 7,
   wherein the pair of left and right sixth reinforcement members are each disposed extending from the middle region toward an upper end portion of the rear end member, and disposed to link the middle region and the upper end portion of the rear end member, when the slewing frame is seen along the left-right direction,
   wherein the pair of left and right seventh reinforcement members are each disposed extending from a position below the sixth reinforcement members and above the rear side part of the slewing bearing toward a lower end portion of the rear end member, and disposed to link the lower end portion of the rear end member and a position, on one of the side plates, below the sixth reinforcement members and above the rear side part of the slewing bearing, when the slewing frame is seen along the left-right direction; and wherein the eighth reinforcement member is fixed to the rear end member, extending along the top-bottom direction, and disposed to link the upper end portion and the lower end portion of the rear end member, when the slewing frame is seen along the left-right direction.

9. The slewing frame for a work machine according to claim 1, wherein the third reinforcement members are each disposed to intersect with one of the fourth reinforcement members at an intersection portion, when the slewing frame is seen along the left-right direction, and the third reinforcement members are each joined to one of the fourth reinforcement members at the intersection portion.

10. A work machine comprising:
the slewing frame for a work machine according to claim 1;
a lower travelling body; and
a slewing bearing disposed between the slewing frame and the lower travelling body, and supporting the slewing frame to allow the slewing frame to slew around the slewing center.

\* \* \* \* \*